(12) United States Patent
Han (10) Patent No.: US 7,417,932 B2
(45) Date of Patent: Aug. 26, 2008

(54) APPARATUS AND METHOD FOR DRIVING LASER DIODE FOR RECORDING DATA ON OPTICAL DISK

(75) Inventor: Cheul Kyung Han, Sungnam-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 680 days.

(21) Appl. No.: 10/743,303

(22) Filed: Dec. 23, 2003

(65) Prior Publication Data

US 2004/0136299 A1 Jul. 15, 2004

(30) Foreign Application Priority Data

Dec. 26, 2002 (KR) .................. 10-2002-0084374

(51) Int. Cl.
*G11B 7/125* (2006.01)

(52) U.S. Cl. .................................. 369/59.11

(58) Field of Classification Search ................ None
See application file for complete search history.

(56) References Cited

U.S. PATENT DOCUMENTS 5,732,062 A * 3/1998 Yokoi et al. ............... 369/116

6,614,739 B1 * 9/2003 Sasaki et al. ............... 369/59.1

FOREIGN PATENT DOCUMENTS

| CN | 1276597 | 12/2000 |
|---|---|---|
| EP | 1 174 862 | 6/2001 |
| EP | 1 211 678 | 11/2001 |
| JP | 2001-067669 | 3/2001 |
| JP | 2001-344752 | 12/2001 |

* cited by examiner

*Primary Examiner*—Joseph Feild
*Assistant Examiner*—Joseph Haley
(74) *Attorney, Agent, or Firm*—Ked & Associates, LLP (57) ABSTRACT

An apparatus and method for driving a laser diode for a recording of data. According to the method, pre-stored variables corresponding to respective manufacturers and respective recording pits of the optical disk are checked. A main pulse based on the checked variables and a sub pulse having a prescribed width are generated. The sub pulse is generated at a prescribed time prior to generating the main pulse. A driving signal for driving a LD to record data is generated upon receiving the main pulse and the sub pulse. Therefore, data recording operations are performed using the driving signal without overpower as in the conventional Mode 1 (e.g., Orange 1), that can take less computation and less time to form recording pits at a desired time/size for a recording period of time as in the conventional Mode 2 (e.g., Orange 2), which can result in improve recording quality.

25 Claims, 10 Drawing Sheets

APPARATUS AND METHOD FOR DRIVING LASER DIODE FOR RECORDING DATA ON OPTICAL DISK

BACKGROUND OF THE INVENTION

1. Field of the Invention

The present invention relates to an optical recording apparatus and method, and more particularly to an apparatus and method for driving a laser diode (LD) for recording data on an optical disk.

2. Background of the Related Art

Figure 1:
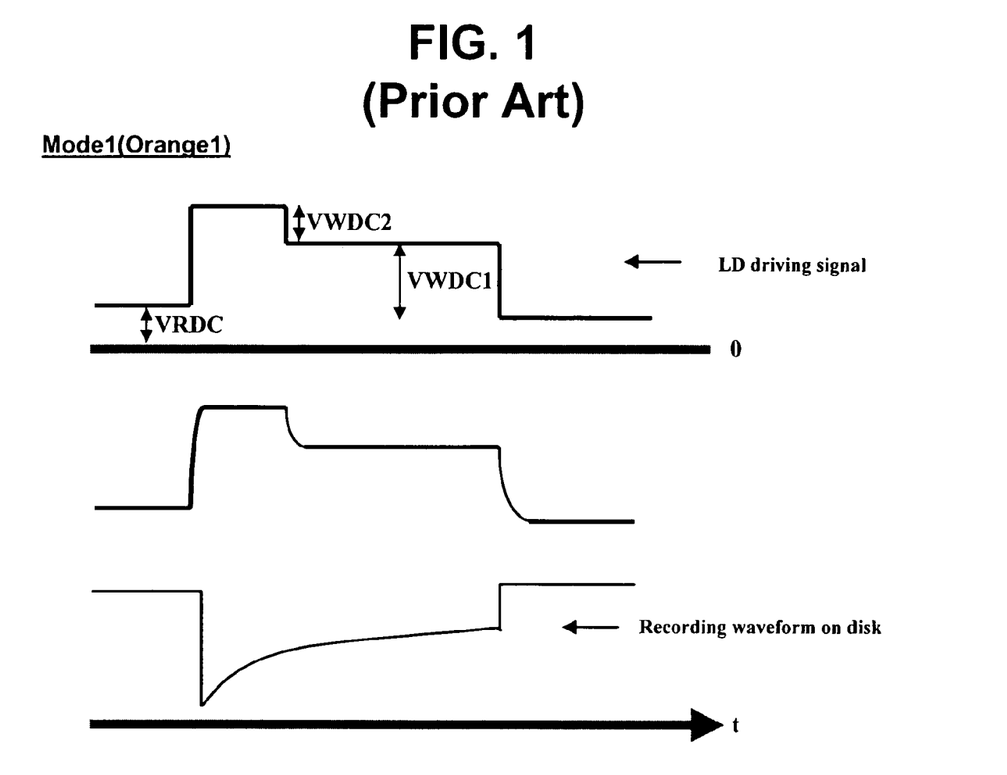
FIG. 1 is a waveform diagram illustrating an LD driving signal based on a conventional Mode 1 (i.e., Orange 1) and a signal shape being recorded on an optical disk using the LD driving signal.
Figure 2:
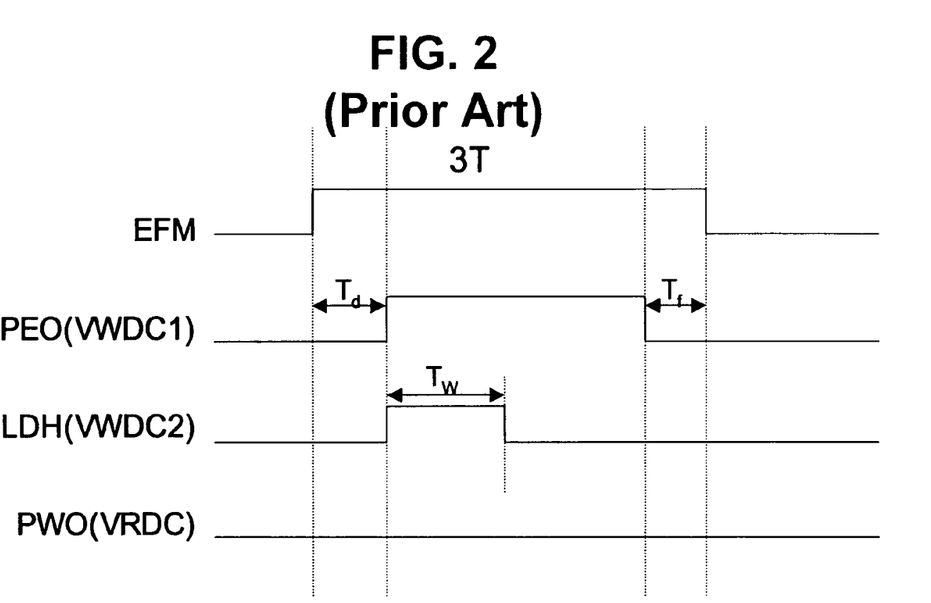
FIG. 2 is a timing diagram illustrating exemplary driving pulses PEO, LDH and PWO according to the conventional Mode 1 (i.e., Orange 1)
Figure 3:
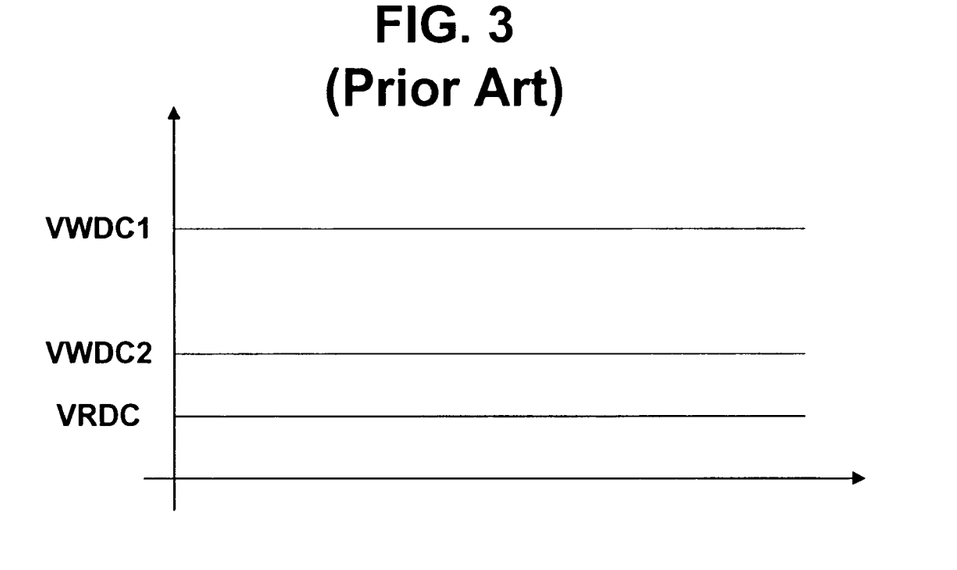
FIG. 3 is a waveform diagram illustrating exemplary driving voltages VRDC, VWDC1 and VWDC2 according to the conventional Mode 1 (i.e., Orange 1)

The Orange Book for describing specifications for a variety of recording disks such as a CD-Recordable (CD-R) disk has typically adapted two recording methods for recording arbitrary data on the CD-R disk. The two recording methods are a Mode 1 (also called an Orange 1) and a Mode 2 (also called an Orange 2), which will hereinafter be described in detail. The Mode 1 (i.e., Orange 1) is defined as a recording method for use with overpower in consideration of medium characteristics of the CD-R disk. When an LD of an optical pick-up device is driven for a recording period of time, a prescribed delay time occurs in a signal's rising edge because of characteristics of the LD, and a recording pit of a desired size is not formed at a desired time. The Mode 1 applies overpower at a prescribed time at which a recording power is turned on. In more detail, because the Mode 1 applies an LD driving signal shown in FIG. 1 to an LD of such an optical pick-up device, a signal's rising edge is quickly formed in the waveform of a real LD driving signal, which results in no delay time in such a signal's rising edge.

The Mode 1 for use with such overpower has an advantage in that it allows a signal's rising time to be faster and thereby correctly and stably forms initial recording pits. However, the Mode 1 has a disadvantage in that it must set up many variables to generate such an LD driving signal with the overpower. In this case, the variables can include time variables Td, Tf and Tw for generating driving pulses PEO and LDH, and other variables VWDC1 and VWDC2, besides a VRDC being a driving voltage.

Therefore, in order to adapt the Mode 1, the variables corresponding to individual recording pits 3T~11T for every disk manufacturer (i.e., every disk code) should be detected and stored in a memory. The time variables Td, Tf and Tw are different for every disk manufacturer and every recording pit. Accordingly, a large amount of work and a long time have been wasted to detect variables and store them in a memory.

Figure 4:
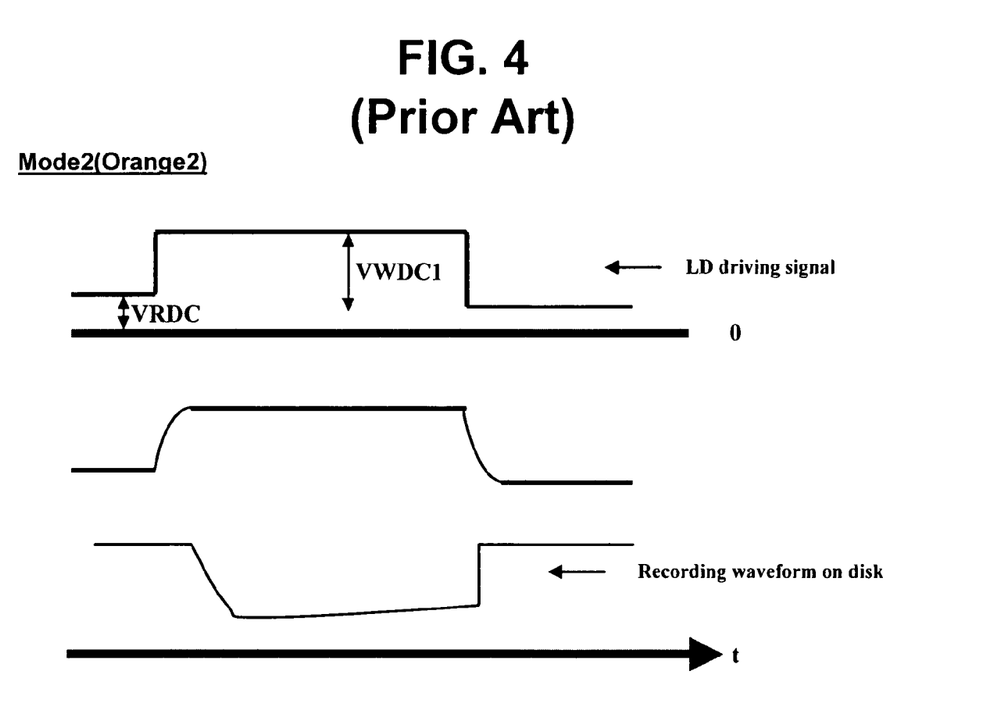
FIG. 4 is a waveform diagram illustrating an LD driving signal based on a conventional Mode 2 (i.e., Orange 2) and a signal shape being recorded on an optical disk using the LD driving signal.

The Mode 2 (i.e., Orange 2) forms recording pits by applying a driving signal having no overpower (e.g., an LD driving signal shown in FIG. 4) to an LD of an optical pick-up device. The Mode 2 need not set up a variable VWDC2, but needs to set up other variables Td, Tf, VRDC and VWDC1.

The Mode 2 has an advantage in that it takes much less work and less time than the Mode 1. However, the Mode 2 has a disadvantage in that it does not correctly form initial recording pits because a prescribed delay time occurs in a signal's rising time because of LD's characteristics, which results in deterioration of the quality of recording marks. Such deterioration of the quality of recording marks becomes serious in a high-speed recording time.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and method for forming recording pits each having a desired size at a desired time without a prescribed delay time in a recording operation.

Another object of the present invention is to provide an apparatus and method for forming recording pits each having a desired size at a desired time without a prescribed delay time in a recording operation without overpower.

Another object of the present invention is to provide an apparatus and method for forming recording pits each having a desired size at a desired time without a prescribed delay time in a recording operation using a main pulse and a subpulse previously generated.

Another object of the present invention to provide an apparatus and method for driving an LD for recording data on an optical disk, which performs a data recording function using an LD driving signal having no overpower as in the conventional Mode 1 and without a prescribed time delay as in the conventional Mode 2.

In order to achieve at least the above objects in a whole or in part and in accordance with the present invention, an apparatus for driving an LD (Laser Diode) for recording data on an optical disk is provided that includes optical pick-up unit for recording data, driver unit for generating a driving signal for driving the optical pick-up unit to adjust an optical power level of the optical pick-up unit, and control unit for generating a main pulse for the driving signal and a sub pulse having a prescribed width, wherein the sub pulse being generated at a prescribed time prior to generating the main pulse.

To further achieve the above objects in a whole or in part in accordance with the present invention, there is provided a method for recording data on an optical storage medium that includes generating a sub-pulse for driving a recording unit, generating a main pulse for driving the recording unit, and controlling the recording unit for recording data based on the sub-pulse and main pulse, wherein the sub-pulse is generated before the main pulse.

To further achieve the above objects in a whole or in part in accordance with the present invention, there is provided an apparatus that includes a processor configured to generate a sub-pulse for driving a recording unit before a main pulse for driving the recording unit, and a driver configured to drive the recording unit to record data for an optical storage medium based on the sub-pulse and main pulse.

The above and other objects, features and other advantages of the present invention will be more clearly understood from the following detailed description taken in conjunction with the accompanying drawings, in which:

BRIEF DESCRIPTION OF THE DRAWINGS

The invention will be described in detail with reference to the following drawings in which like reference numerals refer to like elements wherein.

DESCRIPTION OF THE PREFERRED EMBODIMENTS

Figure 5:
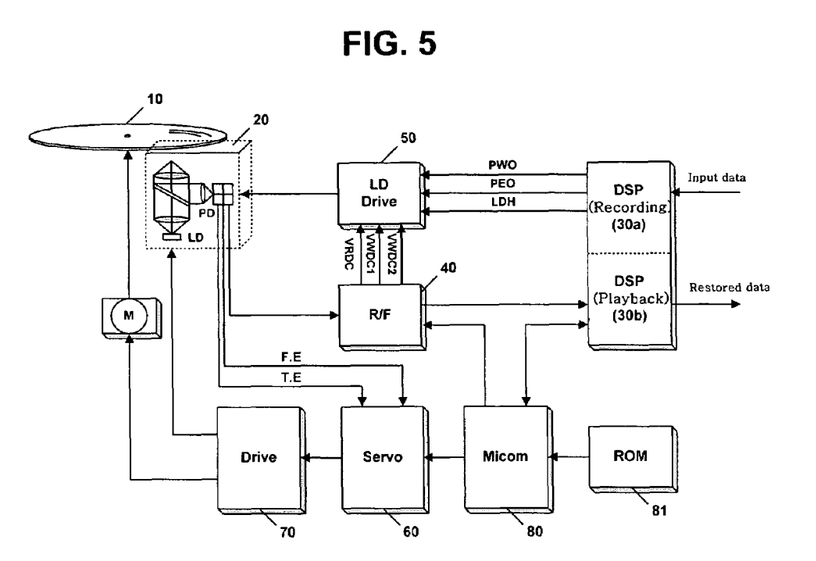
FIG. 5 is a block diagram of a preferred embodiment of an optical disk apparatus having an LD drive for recording data on an optical disk in accordance with the present invention.

FIG. 5 is a schematic diagram illustrating an optical disk apparatus having an LD drive for recording data on an optical disk in accordance with a preferred embodiment of the present invention. As shown in FIG. 5, the optical disk apparatus can include an optical pick-up unit 20 for recording data on an optical disk 10 such as a CD-R disk, and detecting a recording signal from a recording surface of the optical disk 10. A digital recording signal processor 30a is preferably for adding an Error Correction Code (ECC) to received digital data, converting the received digital data into a recording format, re-converting the recording-formatted data into a bit stream, and generating a main pulse on the basis of the bit stream simultaneously with generating a sub-pulse having a prescribed pulse width at a prescribed time prior to generating the main pulse. A Radio Frequency (RF) unit 40 is preferably for generating driving voltages of VDRC, VWDC1 and VWDC2, filtering a signal detected by the optical pick-up unit 20, and generating the filtered signal as a binary signal.

The optical disk apparatus can further include an LD drive 50, a drive unit 70, a servo unit 60, a digital playback signal processor 30b, a Read Only Memory (ROM) 81 and a microcomputer (MICOM) 80. The LD drive 50 is for receiving driving pulses and driving voltages from the digital recording signal processor 30a and the RF unit 40, respectively, and generating an LD driving signal on the basis of the driving pulses and voltages to control an optical power level of the optical pick-up unit 20. The drive unit 70 is for rotating a spindle motor M and sliding the optical pick-up unit 20 back and forth. The servo unit 60 is for controlling an operation of the drive unit 70 on the basis of servo error signals F.E and T.E and a rpm signal of the optical disk 10 and the digital playback signal processor 30b is preferably for restoring the binary signal to original data by means of its own clock signal being phase-locked with the binary signal. The ROM 81 is for storing variables for applying desired or optimal Write Strategies to individual recording pits 3T~11T for every disk manufacturer (e.g., every disk code) and the microcomputer (NICOM) 80 is for executing a recording operation on the basis of the variables stored in the ROM 81.

The optical pick-up unit 20 can have an LD driven by an LD driving signal (e.g., preferably indicative of a current value) of the LD drive 50. The LD drive 50 outputs the LD driving signal to the LD upon receiving driving voltages of VRDC, VWDC1 and VWDC2 and driving pulses PWO, PEO and LDH. The function of providing the LD driving signal by the LD drive 50 will be described below.

Individual driving pulses and driving voltages will now be described in more detail. VRDC is preferably a driving voltage required for reading data, VWDC1 is preferably a main driving voltage required for recording data, and VWDC2 is preferably a sub driving voltage corresponding to additional overpower required for correctly or more accurately and stably forming initial recording pits during a data recording time using the main driving voltage VWDC1.

PWO can be a driving pulse for the voltage VRDC. PEO can be a driving pulse for the main driving voltage VWDC1, and is preferably adapted as a main pulse. LDH can be a driving pulse for the sub driving voltage VWDC2, and is adapted as a sub pulse. In this case, the sub pulse LDH preferably has a signal level identical with that of the main pulse PEO. However, the present invention is not intended to be so limited.

The driving voltages of VRDC, VWDC1 and VWDC2 are preferably transmitted from the RF unit 40 to the LD drive 50, and may also be transmitted from the digital recording signal processor 30a to the LD drive 50. The driving pulses PWO, PEO and LDH are preferably transmitted from the digital recording signal processor 30a to the LD drive 50.

Figure 6:
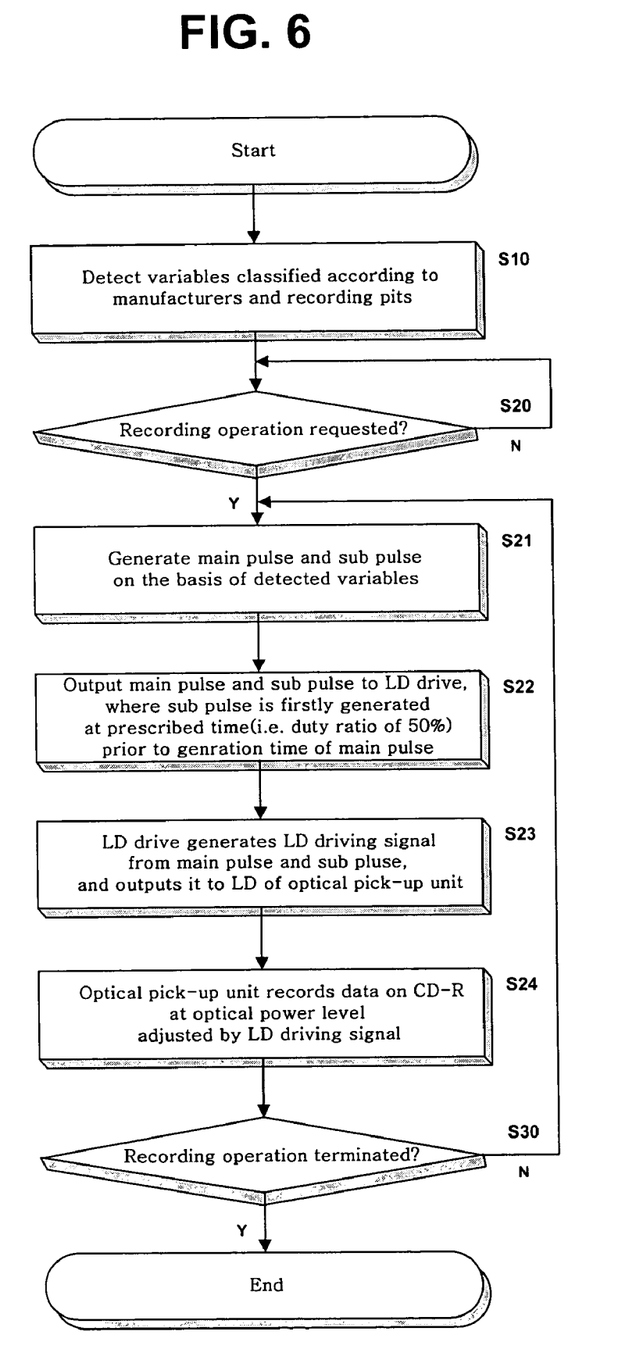
FIG. 6 is a flow chart illustrating a preferred embodiment of an LD driving method for recording data on an optical disk in accordance with the present invention.

FIG. 6 is a flow chart illustrating a preferred embodiment of the present invention an LD driving method for recording data on an optical disk in accordance with the present invention. The LD driving method shown in FIG. 6 can be applied to the apparatus of FIG. 5 and will be described referencing the same.

First, there have been prescribed a variety of variables for applying optimal recording methods to individual recording pits for every disk manufacturer. That is, the variety of variables for recording methods including a variable VRDC, time variables Td and Tf for generating a main pulse PEO, other time variables Ta and Tb for generating a sub pulse LDH, and other variables VWDC1 and VWDC2. The time variables Td and Tf can designate an ON timing and an OFF timing of the main pulse PEO, respectively. The other time variables Ta and Tb can designate an ON timing and an OFF timing of the sub pulse LDH, respectively.

It is assumed that the variable VWDC2 is identical with the variable VWDC2 in preferred embodiments according to the present invention, such that a variety of variables VWDC1 can be detected while being classified according to individual disk manufacturers and individual recording pits, and are then stored in the ROM 81 or the like. A variety of time variables Td and Tf can be detected while being classified according to individual disk manufacturers and individual recording pits, and are then stored in the ROM 81. Recording pits 3T~11T of all the disk manufacturers preferably have the same values of Ta and Tb, such that they are detected while being classified according to individual disk manufacturers, and are then stored in the ROM 81.

In the meantime, the variable Ta designates a duty ratio of 50% that is preferably experimentally detected, and the variable Tb designates a pulse width, for example of T/32, also experimentally detected where T preferably corresponds to a drive period of a LD for a smallest recording pit. The variables Ta and Tb may be different for every disk manufacturer.

In this case, if a CD-R disk 10, which is an optical disk, is inserted into the optical disk apparatus, for example as shown in FIG. 5, the microcomputer 80 determines a manufacturer name of the CD-R disk 10. For example, the microcomputer 80 can detect a start time of a lead-out area from Table Of Contents (TOC) information recorded on a lead-in area of the CD-R disk 10, and determine a manufacturer of the CD-R disk 10 on the basis of the detected start time of such lead-out area. The lead-out area designates an area of a signal indicative of a program termination, but individual disk manufacturers can have different start times in their lead-out areas, such that the microcomputer 80 can discriminate a correct manufacturer of the CD-R disk 10 among many manufacturers.

As shown in FIG. 6, after a process starts a manufacturer of the CD-R disk 10 is determined, then the microcomputer 80 preferably can detect variables, which have been stored in the ROM 81 while having been classified according to individual manufacturers and individual recording pits, from the ROM 81 at step S10. The detected variables may be adjusted to desired or optimal values in response to characteristics of the CD-R disk 10 through the use of an Operation Planning Control (OPC) operation of the microcomputer 80.

If a recording operation is requested at step S20, the microcomputer 80 selects three variables VRDC, VWDC1 and VWDC2 (e.g., VWDC1) from among many variables detected while being classified according to individual pits to be recorded, and preferably applies the selected three variables VRDC, VWDC1 and VWDC2 to the RF unit 40 and the digital recording signal processor 30a, respectively. In this case, the variable Ta is a duty ratio of 50%, and the other variable Tb is preferably a pulse width of T/32 where T is a pulse width of a minimum pulse.

The digital recording signal processor 30a can generate a main pulse PEO serving as a driving pulse of the variable VWDC1 on the basis of two variables Td and Tf, generate a sub pulse LDH serving as a driving pulse of the variable WDC2 on the basis of two variables Ta and Tb, and generate a driving pulse PWO of the variable VRDC at step S21. The digital recording signal processor 30a transmits the pulses PEO, LDH and PWO to the LD drive 50. In this case, the digital recording signal processor 30a can preferably first generate the sub pulse LDH at a prescribed time prior to generating the main pulse PEO on the basis of the variable Ta received from the microcomputer 80 at step S22. In more detail, provided that the variable Ta is set to a prescribed duty ratio (e.g., 50%), the digital recording signal processor 30a preferably generates a pulse signal of about 50% of the pulse width T/32 prior to generating the main pulse.

Figure 7:
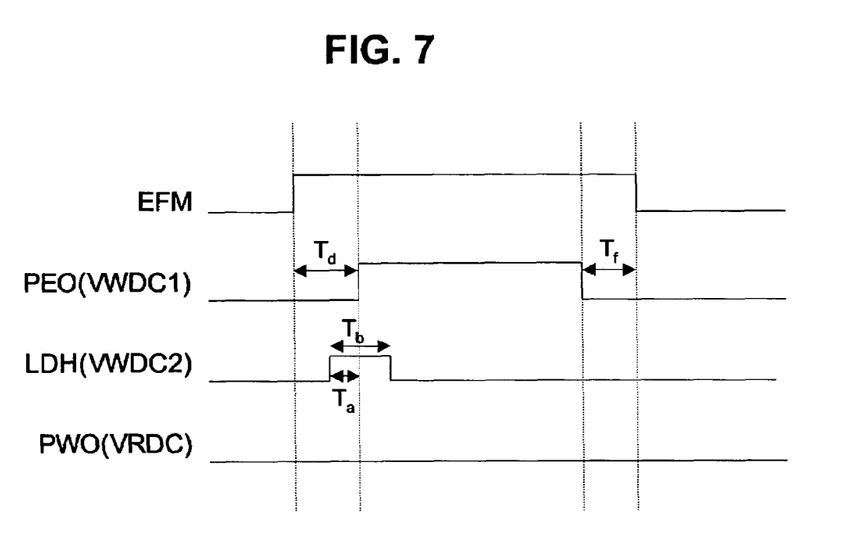
FIG. 7 is a view illustrating exemplary driving pulses PEO, LDH and PWO according to the method of FIG. 6.

In this case, a signal level of the main pulse PEO can be identical with that of the sub pulse LDH. Such examples of PEO, LDH and PWO are shown in FIG. 7.

Figure 8:
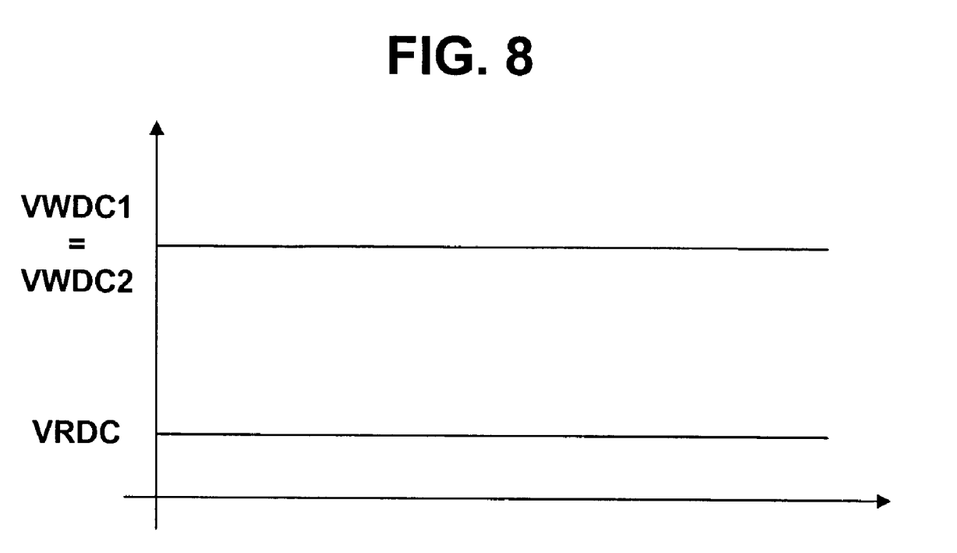
FIG. 8 is a view illustrating exemplary driving voltages of VRDC, VWDC1 and VWDC2 according to the method of FIG. 6.

The RF unit 40 preferably outputs the driving voltages of VRDC, VWDC1 and VWDC2 to the LD drive 50. Such driving voltages are exemplarily shown in FIG. 8.

The LD drive 50 can receive driving voltages of VRDC, VWDC1 and VWDC2 from the RF unit 40, and can generate them by the use of a switching operation of the driving pulses PEO, LDH and PWO preferably received from the digital recording signal processor 30a. In conclusion, the LD drive 50 preferably outputs an LD driving signal shown in FIG. 9 to an LD contained in the optical pick-up unit 20 at step S23. Therefore, the optical pick-up unit 20 records data on the CD-R disk 10 at an optical power level being adjusted by the LD driving signal at step S24. Then, it is determined at step S30 whether such a recording operation is terminated. If it is determined at step S30 that the recording operation is terminated, a process is also terminated. Otherwise, if it is determined at step S30 that the recording operation is not terminated, control can return to step S21.

Figure 9:
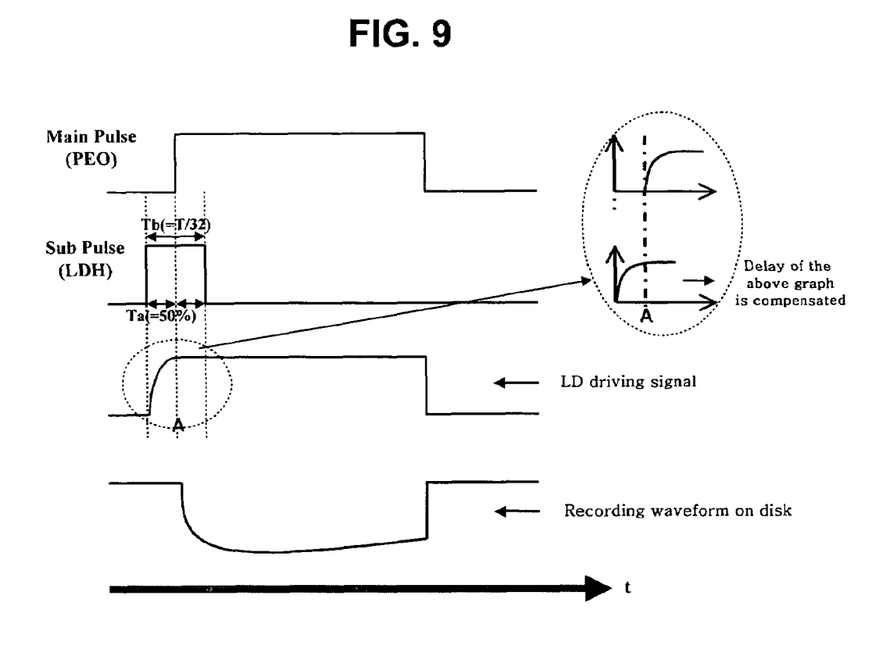
FIG. 9 is a waveform diagram illustrating an LD driving signal and a signal shape being recorded on an optical disk using the LD driving signal according to the method of FIG. 6.

FIG. 9 is a diagram illustrating an LD driving signal and a signal waveform being recorded on the CD-R disk 10 using the LD driving signal. Referring to FIG. 9, the LD driving signal can overlap with a rising edge of the main pulse PEO and a rising edge of the sub pulse LDH. A rising edge of the LD driving signal is variably depending on the waveform of the sub pulse LDH, such that the rising time of the LD driving signal can be reduced.

Figure 10:
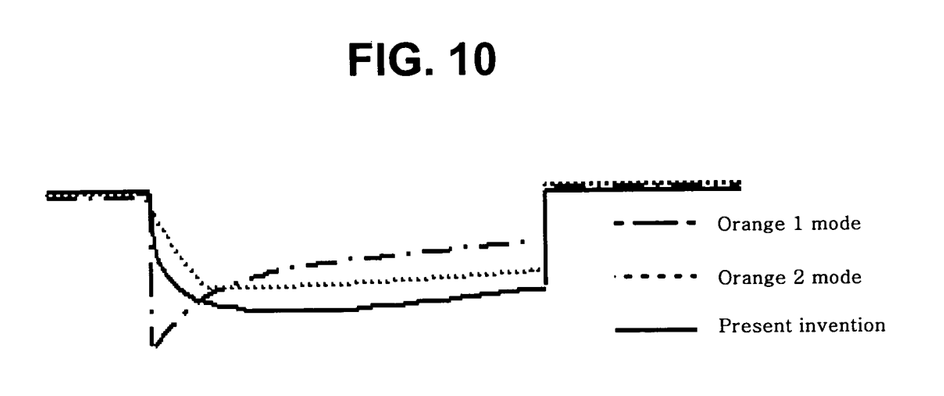
FIG. 10 is a waveform diagram illustrating the comparison result among the conventional Mode 1 (i.e., Orange 1), the conventional Mode 2 (i.e., Orange 2), and according to a preferred embodiment of a driving signal according to the present invention.

FIG. 10 is a diagram illustrating a comparative result among the conventional Mode 1 (i.e., Orange 1), the conventional Mode 2 (i.e., Orange 2), and a preferred embodiment of a recording mode according to the present invention. As shown in FIG. 10, it is noted that a recording mode according to a preferred embodiment of the present invention can form recording pits being more accurately reproducible than the conventional Mode 2, however the conventional Mode 1 has the most stable recording waveform.

As described above, preferred embodiments of an apparatus and method for driving a LD according to the present invention have various advantages. Preferred embodiments of the present invention need not set up the sub driving voltage VWDC2, and since the same values of Ta and Tb can be applied to individual recording pits, less system resources (e.g., less work and less time to detect and store variable values) are use relative to the conventional Mode 1. Also, a recording quality of a data recording operation is similar to that of the conventional Mode 1, and forms a recording pit more correctly and stably than the conventional Mode 2.

Preferred embodiment of the present invention can provide an apparatus and method for driving an LD for recording data on an optical disk such as a CD-R disk, which performs a data recording operation using an LD driving signal having no overpower as in the conventional Mode 2 (i.e. Orange 2), and takes less work and less time to detect and store variable values for optimal recording methods. Also, the apparatus correctly and stably forms recording pits each having a desired size at a desired time for a recording period of time as in the conventional Mode 1, resulting in improvement of the recording quality.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

What is claimed is:

1. An apparatus, comprising:
   optical pick-up for recording data;
   driver circuit for generating a driving signal for driving the optical pick-up to adjust an optical power level of the optical pick-up; and
   control circuit for generating a main pulse and a sub-pulse for the driving signal, the sub pulse having a prescribed width that at least partially overlaps the main pulse, wherein the sub pulse is generated at a prescribed amount of time prior to generating the main pulse, the prescribed amount of time corresponding to a predetermined portion of a duty ratio of said sub pulse, and wherein the driving signal rises to a first level during the prescribed amount of time prior to when the main pulse is generated, and the driving signal stays at said first level for a remaining time of the prescribed width of the sub pulse.

2. The apparatus as set forth in claim 1, wherein the sub pulse overlaps the main pulse for approximately the prescribed amount of time.

3. The apparatus as set forth in claim 1, wherein the sub pulse has substantially the same signal level as that of the main pulse.

4. The apparatus as set forth in claim 1, wherein the driver circuit is driven by signals indicative of a magnitude and ON/OFF timings of the main pulse and signals indicative of a magnitude and ON/OFF timings of the sub pulse.

5. The apparatus as set forth in claim 1, further comprising:
a storage circuit for storing variables indicative of respective start and end times and respective magnitudes of the main pulse and the sub pulse according to sizes of respective recording pits, wherein the control circuit generates the main pulse and the sub pulse using a subset of the variables corresponding to each size of the recording pits.

6. The apparatus as set forth in claim 1, further comprising:
a storage circuit for storing variables indicative of respective start and end times and respective magnitudes of the main pulse and the sub pulse according to individual disk manufacturers, wherein the control means generates the main pulse and the sub pulse using corresponding variables of the variables for each disk manufacturer.

7. A method for driving an LD (Laser Diode) for recording data on an optical disk, comprising:
checking pre-stored variables according to respective manufacturers and respective recording pits of the optical disk;
generating a main pulse based on the checked variables and a sub pulse having a prescribed width that at least partially overlaps the main pulse, the sub pulse being generated at a prescribed amount of time prior to generating the main pulse, the prescribed amount of time corresponding to a predetermined portion of a duty ratio of said sub pulse;
outputting a driving signal for driving an LD contained in an optical pick-up unit based on the main pulse and the sub pulse, wherein the driving signal rises to a first level during the prescribed amount of time prior to when the main pulse is generated, and the driving signal stays at said first level for a remaining time of the prescribed width of the sub pulse; and
recording the data on the optical disk at an optical power level adjusted by the driving signal.

8. The method as set forth in claim 7, wherein the sub pulse has substantially the same signal level as the main pulse, and has a pulse width less than a drive period of the LD for a smallest recording pit.

9. The method as set forth in claim 7, wherein the checked pre-stored variables are indicative of a magnitude and ON/OFF timings of the main pulse, and variables indicative of a magnitude and ON/OFF timings of the sub-pulse.

10. A method for recording information on an optical storage medium, comprising:
generating a sub-pulse for driving a recording unit;
generating a main pulse for driving the recording unit; and
controlling the recording unit for recording data based on the sub-pulse and main pulse, wherein the sub-pulse is generated before the main pulse, wherein the sub-pulse is generated a predetermined amount of time before the main pulse which corresponds to a predetermined portion of a duty ratio of the sub-pulse, said main pulse and sub-pulse forming a driving signal that rises to a first level during the prescribed amount of time prior to when the main pulse is generated and the driving signal stays at said first level for a remaining time of the prescribed width of the sub pulse.

11. The method of claim 10, wherein the duty ratio is 50%.

12. The method of claim 10, further comprising: detecting the duty ratio based on timing data stored on the optical storage medium.

13. The method of claim 10, wherein said predetermined time is based on a type of optical storage medium or a width of the sub-pulse.

14. The method of claim 13, wherein said width is equal to T/32, wherein T corresponds to a drive period of the recording unit for a smallest recording pit.

15. The method of claim 13, further comprising:
detecting said width based on timing data stored on the optical storage medium.

16. The method of claim 10, further comprising:
reading information from the optical storage medium; and
determining a manufacturer of the optical storage medium based on said information.

17. The method of claim 16, wherein said information includes a start time of a lead-out area, a start time of a lead-in area or disc id from a table of contents stored on the medium.

18. The method of claim 16, further comprising:
retrieving timing information corresponding to said manufacturer; and
generating the sub-pulse a predetermined amount of time before generation of the main pulse based on the timing information.

19. An apparatus, comprising:
a processor configured to generate a sub-pulse for driving a recording unit before a main pulse for driving the recording unit; and
a driver configured to drive the recording unit to record data for an optical storage medium based on the sub-pulse and main pulse, wherein the processor generates the sub-pulse a predetermined amount of time before the main pulse, said predetermined amount of time based on a duty ratio of the sub-pulse, and
wherein the driver generating a driving signal for driving the recording unit based on the main pulse and sub-pulse, the driving signal rising to a first level during the predetermined amount of time prior to when the main pulse is generated and the driving signal staying at said first level for at least a remaining time of said overlap.

20. The apparatus of claim 19, wherein the processor determines the duty ratio based on timing data stored on the optical storage medium.

21. The apparatus of claim 19, wherein said predetermined amount of time is based on a type of optical storage medium or a width of the sub-pulse.

22. The apparatus of claim 21, wherein the processor determines a width of the sub-pulse based on timing data stored on the optical storage medium.

23. The apparatus of claim 19, further comprising:
a reading unit that reads information from the optical storage medium,
wherein the processor determines a manufacturer of the optical storage medium based on said information.

24. The apparatus of claim 23, further comprising:
a memory that stores timing information corresponding to said manufacturer;
wherein the processor generates the sub-pulse a predetermined amount of time before generation of the main pulse based on the tinting information retrieved from memory.

25. The apparatus as set forth in claim 1, wherein the driving signal maintains substantially the first level throughout the duration of the main pulse.

* * * * *